Aug. 11, 1953     F. W. KRUEGER     2,648,416
REVERSIBLE CLUTCH FOR HYDRAULIC POWER MECHANISM
Filed Sept. 11, 1950     4 Sheets-Sheet 1

INVENTOR
*Frank W. Krueger*
BY
ATTORNEYS

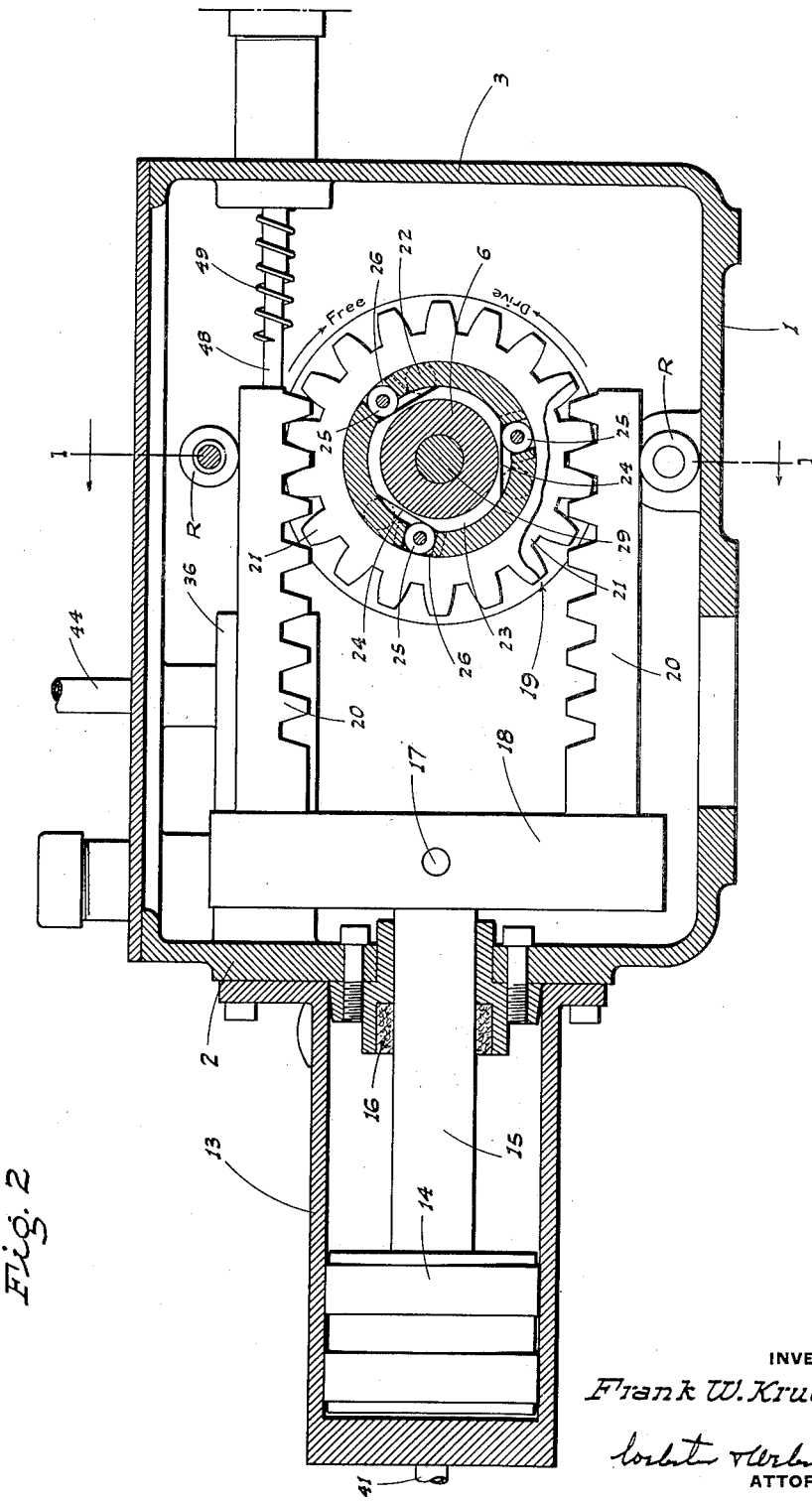

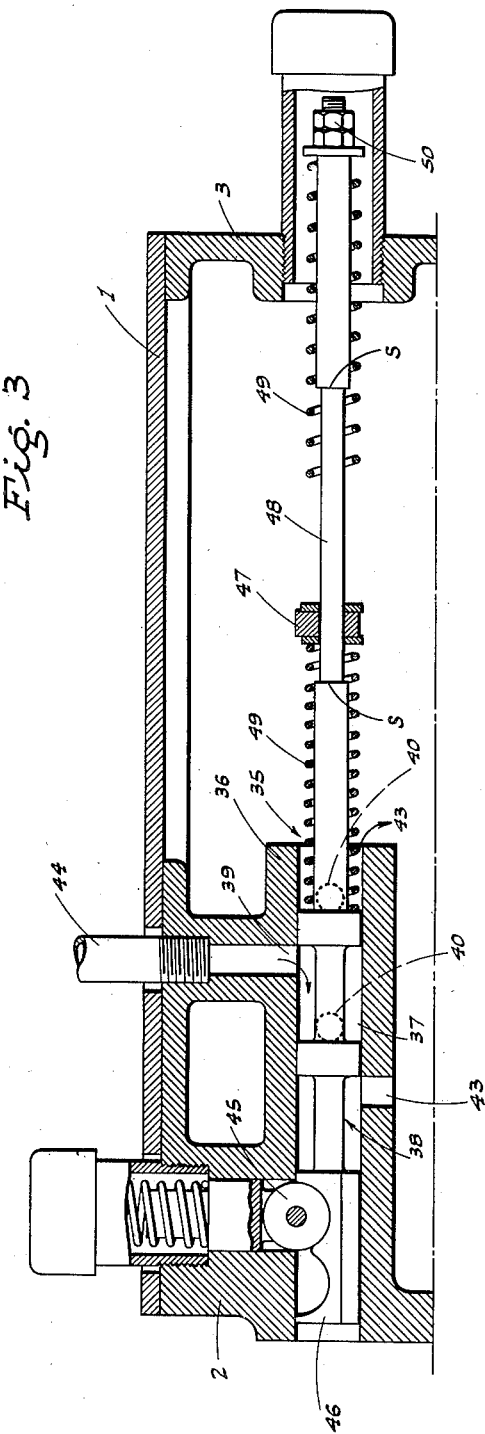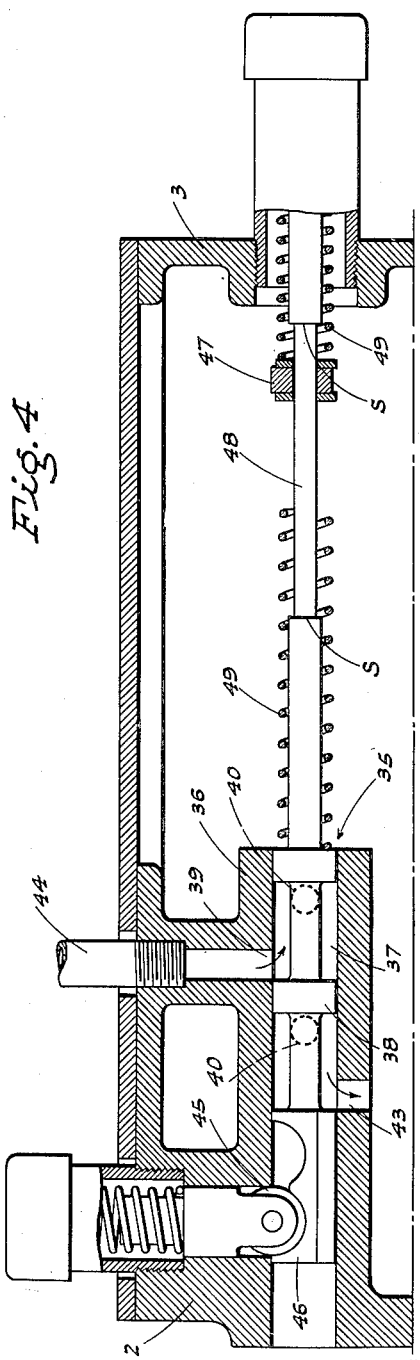

Aug. 11, 1953   F. W. KRUEGER   2,648,416
REVERSIBLE CLUTCH FOR HYDRAULIC POWER MECHANISM
Filed Sept. 11, 1950   4 Sheets-Sheet 4
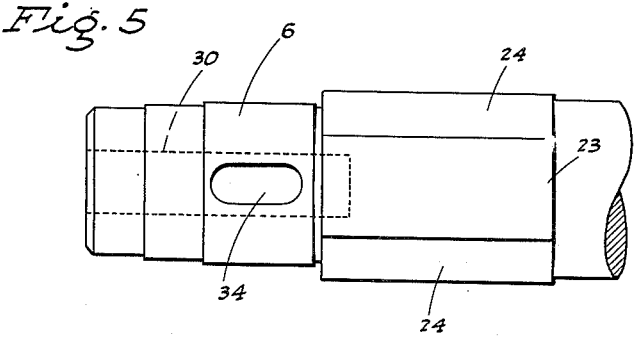
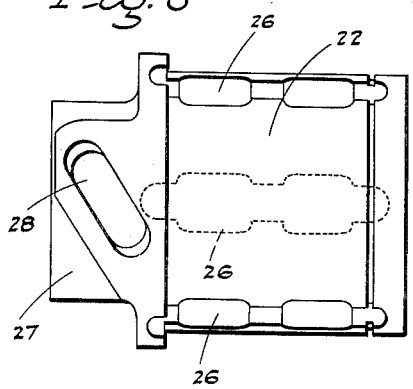
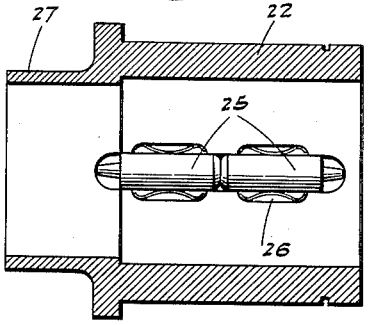
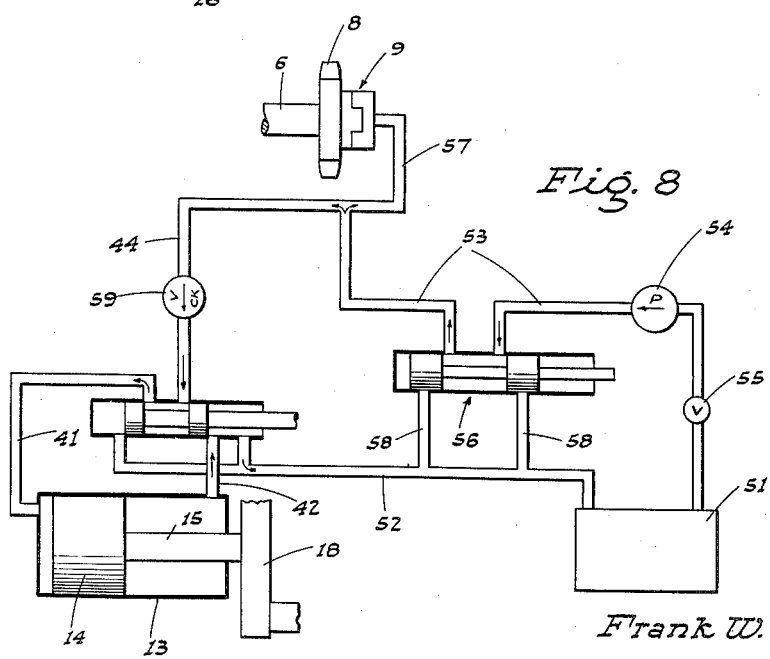
INVENTOR
*Frank W. Krueger*
BY
ATTORNEYS Patented Aug. 11, 1953

2,648,416

UNITED STATES PATENT OFFICE 2,648,416

REVERSIBLE CLUTCH FOR HYDRAULIC POWER MECHANISM

Frank W. Krueger, Saratoga, Calif., assignor to Be-Ge Manufacturing Co., Gilroy, Calif., a corporation of California Application September 11, 1950, Serial No. 184,160

1 Claim. (Cl. 192—44)

This invention is directed to, and it is a major object to provide, a novel mechanism operative to convert hydraulic pressure into substantially constant rotary motion; the mechanism, in effect, being a fluid motor.

Another important object of the invention is to provide a hydraulic power mechanism which includes, in novel combination, a hydraulic power cylinder caused to reciprocate by means of an automatic reversing valve unit, and a double-acting dual rack and pinion assembly reciprocated by the power cylinder and mounted in driving relation on a main shaft; the arrangement being compact, sturdy, and positive in operation.

A further object of the invention is to provide a hydraulic power mechanism, as in the preceding paragraph, which includes a rotary output member, such as a sprocket, turnable on the main shaft, and a hydraulically actuated clutch interposed between the main shaft and said rotary output member; there being a manual control valve arranged to control operation of the power cylinder and clutch.

An additional object of the invention is to provide a hydraulic power mechanism which is well adapted, but not limited, for use to propel an implement, such as a rotary ditcher, forcefully along the ground at a very slow rate of travel; i. e. to cause the implement to "creep" at a relatively constant speed.

It is also an object of the invention to provide a hydraulic power mechanism, of the type described, wherein the included double-acting dual rack and pinion assembly embodies a novel reversing device whereby the driven shaft can be caused to rotate one direction or the other, selectively.

Still another object of the invention is to provide a practical and reliable hydraulic power mechanism, and yet one which will be exceedingly effective for the purpose for which it is designed.

These objects are accomplished by means of such structure and relative arrangement of parts as will fully appear by a perusal of the following specification and claim.

In the drawings:

Fig. 2 is a longitudinal section of the device taken on line 2—2 of Fig. 1.

Fig. 3 is a fragmentary longitudinal section on line 3—3 of Fig. 1, showing the automatic reversing valve unit in one position.

Fig. 4 is a similar view, but shows said automatic reversing valve unit in the opposite position.

Fig. 5 is a fragmentary elevation of the main shaft detached; the view showing the portion of the shafts with which the double-acting dual rack and pinion assembly cooperates.

Fig. 6 is a plan view of the roller shifting cage, detached.

Fig. 7 is a sectional elevation of the same.

Fig. 8 is a diagram of the hydraulic pressure system.

Figure 1:
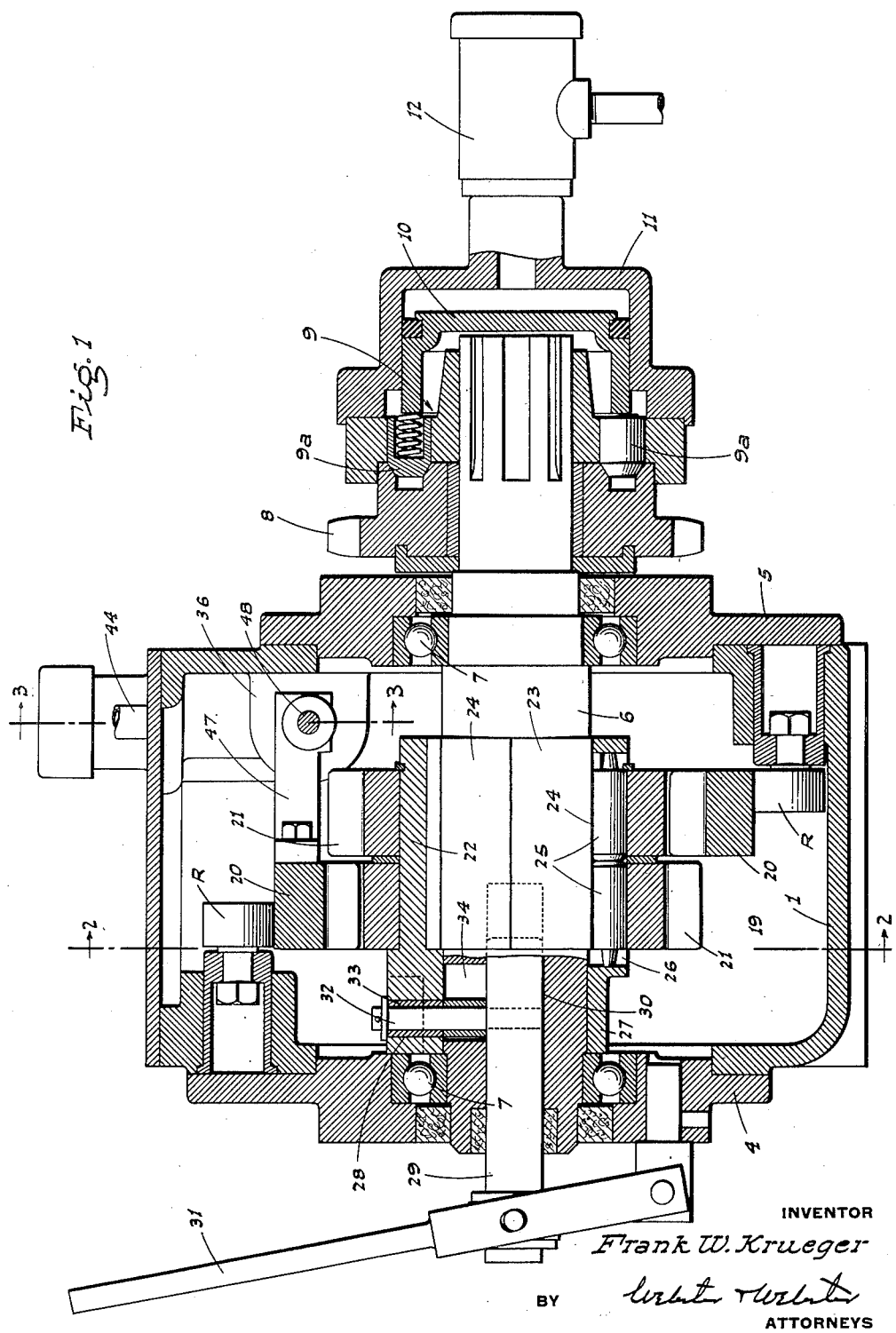
Fig. 1 is a cross section of the mechanism taken on line 1—1 of Fig. 2.

Referring now more particularly to the characters of reference on the drawings, the novel, hydraulic power mechanism comprises a housing, indicated generally at 1, which housing includes end heads 2 and 3, and side plates 4 and 5.

A horizontal main shaft 6 extends transversely through the housing 1, being journaled in connection with the side plates 4 and 5 by means of bearings 7 associated with appropriate seals, as shown.

The main shaft 6 projects some distance beyond the side plate 5, and a final drive member, here in the form of a sprocket 8, is turnable on said projecting portion of the shaft; there being a hydraulically actuated clutch assembly, indicated generally at 9, interposed between said projecting portion of the shaft and the sprocket 8.

The clutch assembly 9 includes tapered self-retracting dogs 9a adapted to be advanced by a spring-cushioned hydraulic pressure fed thereto through the medium of a fitting 12.

Upon entry of hydraulic pressure into the cylinder 11, the piston 13 advances to advance the clutch dogs 10, whereby the main shaft 6 is then connected in driving relation to the sprocket 8.

A hydraulic power cylinder 13 is mounted in connection with, and projects from, the end head 2, horizontally, with the axis of the power cylinder in the same vertical plane as the axis of the main shaft 6, but at right angles thereto. The hydraulic power cylinder 13 includes a piston 14, and a connecting rod 15 which slidably projects through a suitable packing gland 16 in the end head 2; the free end of the connecting rod 15 being coupled, as at 17, to a cross head 18 disposed in the housing 1. This cross head is included in a double-acting, dual rack and pinion assembly, indicated generally at 19, which is employed between the connecting rod 15 and the main shaft 6 to cause substantially constant rotary motion of the latter upon reciprocation of the piston 14.

The double-acting, dual rack and pinion assembly 19 comprises, together with the cross head 18, a pair of opposed racks 20 which project from said cross head in spaced parallel relation, passing the main shaft 6 on opposite sides thereof. The racks 20, while parallel to the axis of the connecting rod 15, are laterally offset relative to each other, and run in mesh with corresponding pinions 21 turnable on a cage 22, which is in turn mounted on an enlarged portion 23 of the main shaft 6. The racks 20 are held in mesh with the pinions 21 by suitably mounted rollers R.

The following automatic clutch device is employed between each pinion 21 and the enlarged portion 23 of the shaft 6; the clutch arrangement being such that upon one stroke of the racks one pinion drives the shaft, while on the other stroke of the racks the other pinion drives the shaft; the pinion which is not clutched in driving relation to the shaft overrunning in each instance. This is accomplished as follows:

The enlarged portion 23 of the shaft 6 is formed with a plurality of circumferentially spaced clutch flats 24, and the cage 22 is fitted, in corresponding circumferentially spaced relation, with a plurality of pairs of clutch rollers 25, with the rollers of each pair in end to end relation and disposed in slots 26. The rollers 25, as carried by the cage 22, thus lie between the corresponding clutch flats 24 and the inner periphery of the pinions 21; each circumferential row of the rollers 25 lying within the radial plane of the corresponding pinion 21.

The cage 22 is normally disposed so that the rollers 25 are adjacent one side of the corresponding clutch flat 24, whereby each pinion 21, when rotated in one direction, causes the corresponding clutch rollers 25 to grip and drive the main shaft 6, overrunning in the opposite direction. As the pinions 21 are reversely actuated with each stroke of the racks 20 caused by the hydraulic power cylinder 13, the described clutching arrangement causes said pinions 21 to impart a substantially constant drive to the main shaft 6; one pinion working while the other overruns, and vice-versa.

It will be recognized that upon part-rotation of the cage 22, whereby to dispose the clutch rollers 25 adjacent the opposite side of the corresponding clutch flat 24, the clutch arrangements will function in reverse, with consequent reverse drive of the main shaft 6 upon reciprocation of the racks 20 by the hydraulic power cylinder 13. Such part-rotation of the cage 22 is accomplished as follows:

Adjacent the side plate 4 the cage 22 is formed with an end hub 27 having a diagonal slot 28 therein. A shifting rod 29 is axially slidably disposed in a bore 30 which opens to the adjacent end of the main shaft 6; said rod 29 being adapted to be axially shifted by an externally mounted lever 31.

A radial pin 32 having a turnable bearing sleeve 33 thereon projects radially from the shifting rod 29, through an elongated slot 34 in the shaft 6, and thence extends into the diagonal slot of the hub 27 on cage 22. Thus, by shifting rod 29 by lever 31, the radial pin 32 and the bearing sleeve 33 work in the diagonal slot 28 to cause a part-turn of the cage 22.

As the cage 22 is rotated from one position to another, the alined pairs of clutch rollers 25 are adjusted from a position adjacent one side of the corresponding clutch flat 22 to a position adjacent the other side, so as to reverse the clutching and overrunning action between each pinion 21 and the main shaft 6. With this arrangement, effective reversal of the power mechanism between the hydraulic power cylinder 13 and final drive sprocket 8 is attained without starting or stopping the power cylinder 13, and without in any way affecting the normal operation of the latter, which is as follows:

The hydraulic power cylinder 13 is caused to reciprocate by means of an automatic reversing valve unit, indicated generally at 35. The valve unit 35 comprises a valve body 36, in the housing 1, formed with a bore 37 which extends axially parallel to the path of motion of the racks 20.

A dual piston valve 38 is mounted in the bore 37 for reciprocation, such valve 38 being adapted to alternately feed hydraulic pressure from a supply port 39 to feed ports 40, which are connected by ducts 41 and 42 to opposite ends of the hydraulic power cylinder 13. Also, the valve 38 uncovers the opposite pressure relief or exhaust port 43 as pressure is fed to one of the feed ports 40. Hydraulic pressure is delivered to the port 39 by a conduit 44 of a hydraulic pressure supply system, as shown in Fig. 8, and which will hereinafter be described in greater detail.

The valve 38 is yieldably held in its alternate working positions by a roller-type, spring-pressed detent 45 working in cooperation with a notched holding plunger 46 which is an extension of one end of said valve, and which plunger rides in the bore 37.

The valve 38 is reciprocated in the bore 37, with proper timing, by a lateral finger 47 which projects from one of the racks 20, and a control rod 48 extends through such lateral finger in slidable relation; such control rod 48 being an axial extension of the valve 38 and having stop shoulders S between which finger 47 moves.

Compression springs 49 surround the control rod 48, one between the lateral finger 47 and the valve 38, and another between said finger 47 and a stop nut assembly 50 on the end of the rod opposite said valve. There is considerable play between the springs and the lateral finger 47, as shown. The result is that as finger 47 moves in one direction, it finally engages the adjacent stop S, and then shifts rod 48 itself until plunger 46 has fully raised roller 45 out of one notch, at which point finger 47 has reached the end of its stroke. In the meantime however, the related spring 49 has been compressed, and when the roller 45 has been lifted out of one notch as above stated, said spring suddenly acts to further advance rod 48 to place roller 45 in the other notch of detent 46. Valve 38 is thus reversed only as the racks 20 are substantially at the end of the corresponding stroke. The result is that the valve unit 35 is reversed, with proper timing, to cause constant and smooth reciprocation of the hydraulic power cylinder 13.

The hydraulic pressure supply system, which is employed in connection with the described hydraulic power mechanism, is shown diagrammatically in Fig. 8.

The numeral 51 indicates a fluid reservoir, which reservoir may be the housing 1, or a tank to which said housing opens. In this connection it is to be noted that the pressure relief or exhaust ports 43 deliver directly into the housing 1, but for the purpose of illustration the diagrammatic system in Fig. 8 is shown with a return conduit 52.

A hydraulic pressure feed conduit 53 leads from the reservoir 51, having a hydraulic pump 54 interposed therein, together with a hand valve 55.

Beyond the pump 54 the hydraulic pressure feed conduit 53 feeds to and from a manual control valve 56, and beyond said valve the conduit 53 branches, one branch 57 leading to the cylinder 11 of the hydraulic clutch assembly 9, while the other branch, which is the conduit 44, leads to the automatic reversing valve 35.

The manual control valve 56 is a double-piston, three-position valve, as shown, and there are 5 conduits 58 which lead from said control valve to the return conduit 52. The control valve 56 may be set in one position, as illustrated, to feed hydraulic pressure to the power cylinder 13 and clutch assembly 9, so as to cause said cylinder to function and the clutch to be engaged simultaneously.

A pre-loaded check valve 59 in the conduit 44 is employed to the end that the clutch assembly 9 engages slightly in advance of the power cylinder 13 beginning to operate.

In another position both said piston and clutch assembly are inoperative, and the hydraulic pressure from the pump vents to the reservoir, as well as being vented back from the conduit 53.

In an intermediate position of said valve high pressure is held or locked up in the conduit 53 beyond the valve 56, whereby to maintain the clutch assembly 9 engaged, but without the power cylinder 13 functioning.

With the described hydraulic power mechanism hydraulic pressure is converted effectively and positively into substantially constant rotary motion; the device working smoothly and forcefully. In one adaptation of the device it is employed in connection with a tractor mounted rotary ditcher and serves to convert hydraulic pressure from the tractor pump to rotary motion of the final drive sprocket 8; the latter being chain-connected to the tractor axle to cause the tractor to creep forward slowly, as is requisite for proper operation of the ditcher.

The ditcher is driven from the power take-off shaft of the tractor, and requires the tractor engine to be operated relatively fast, and faster than the desired ground speed which would automatically result. Hence, the herein described hydraulic power mechanism is employed to convert the available hydraulic pressure to creeping motion of the tractor.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a power mechanism which includes a rotary shaft and a rotary member concentric with and through which the shaft projects; a reversible clutch connection between the shaft and member and comprising a cage turnable on an intermediate portion of the shaft and on which the rotary member is turnably supported, a hub projecting from the cage and turnable on one end portion of the shaft ahead of said intermediate portion and the rotary member, reversible clutch connection means between the cage and shaft and actuated upon rotation of the cage relative to the shaft, means to so rotate the cage including a rod slidable in said end portion of the shaft and projecting therefrom for push-pull manipulation, a casing enclosing the cage, rotary member and hub and in which the shaft beyond the hub is journaled, a lever outside the casing and disposed at right angles to the rod, a pivotal mount for the lever on the casing, and a connection between the rod and lever to slide the rod upon reciprocation of the lever.

FRANK W. KRUEGER.

References Cited in the file of this patent

UNITED STATES PATENTS

| Number | Name | Date |
| --- | --- | --- |
| 236,310 | Dees | Jan. 4, 1881 |
| 549,118 | Faulkner | Nov. 5, 1895 |
| 1,078,151 | Lamb | Nov. 11, 1913 |
| 1,163,803 | Bickford | Dec. 14, 1915 |
| 1,195,520 | Snideman | Aug. 22, 1916 |
| 1,375,711 | Lower | Apr. 26, 1921 |
| 1,437,120 | Stephenson | Nov. 28, 1922 |
| 1,692,771 | Ferris | Nov. 20, 1928 |
| 1,927,046 | Powell | Sept. 19, 1933 |
| 1,976,791 | Ljungstrom | Oct. 16, 1934 |
| 2,497,608 | Herrstrum et al. | Feb. 14, 1950 |